(12) United States Patent
Huang et al.

(10) Patent No.: US 11,835,285 B2
(45) Date of Patent: Dec. 5, 2023

(54) CHILLER AND ENERGY STORAGE SYSTEM

(71) Applicant: SHENZHEN ENVICOOL TECHNOLOGY CO., LTD., Guangdong (CN)

(72) Inventors: Tianfu Huang, Guangdong (CN); Shuifu Yang, Guangdong (CN); Wenzhen Huang, Guangdong (CN)

(73) Assignee: SHENZHEN ENVICOOL TECHNOLOGY CO., LTD., Guangdong (CN)

( * ) Notice: Subject to any disclaimer, the term of this patent is extended or adjusted under 35 U.S.C. 154(b) by 31 days.

(21) Appl. No.: 17/561,709

(22) Filed: Dec. 24, 2021

(65) Prior Publication Data
US 2022/0205699 A1 Jun. 30, 2022

(30) Foreign Application Priority Data
Dec. 24, 2020 (CN) .......................... 202023200294.2

(51) Int. Cl.
*F25D 17/02* (2006.01)
*H01M 10/6568* (2014.01)
*F25D 23/00* (2006.01)
*F25D 29/00* (2006.01)

(52) U.S. Cl.
CPC ........... *F25D 17/02* (2013.01); *F25D 23/006* (2013.01); *F25D 29/005* (2013.01); *H01M 10/6568* (2015.04)

(58) Field of Classification Search
CPC .. F24F 1/24; F24F 1/22; F25D 29/005; F25D 17/02; F25D 23/006; H01M 10/6568
See application file for complete search history.

(56) References Cited

FOREIGN PATENT DOCUMENTS

| CN | 202697068 | * | 1/2013 | ............... H05K 5/00 |
| WO | WO2009/150804 | * | 12/2009 | ............... F24F 5/00 |

OTHER PUBLICATIONS

English language machine translation of WO 2009/150804. Translated Mar. 2023 (Year: 2009).*
English language machine translation of CN 202697068. Translated Mar. 2023 (Year: 2013).*

* cited by examiner

*Primary Examiner* — Cassey D Bauer
(74) *Attorney, Agent, or Firm* — Yue (Robert) Xu; Apex Attorneys at Law, LLP (57) ABSTRACT

A chiller and an energy storage system are provided. The chiller includes a mechanical refrigeration system, an electric control module and a warehouse. The mechanical refrigeration system includes a compressor, a condenser, an electronic expansion valve and a heat exchanger which are circularly connected by a refrigerant circulation pipeline. The mechanical refrigeration system further includes a condensing fan. The compressor, the condenser, the electronic expansion valve, the heat exchanger and the electric control module are located in the warehouse. The condensing fan is configured to drive external air into the warehouse, the electric control module is adjacent to the condenser and the electric control module and the condenser are inclined to each other, and an air duct with a width gradually decreasing from upstream to downstream in an air flow direction is formed between the electric control module and the condenser.

19 Claims, 7 Drawing Sheets

CHILLER AND ENERGY STORAGE SYSTEM

The present application claims the priority to Chinese Patent Application No. 202023200294.2, titled "CHILLER AND ENERGY STORAGE SYSTEM", filed on Dec. 24, 2020 with the China National Intellectual Property Administration, which is incorporated herein by reference in its entirety.

FIELD

The present application relates to the technical field of chillers, and in particular to a chiller and an energy storage system.

BACKGROUND

A chiller is widely applied in an electronic, a chemical, manufacturing and other industries, mainly including an air-cooling chiller and a water-cooling chiller. Some chillers obtain cooling capacity through a mechanical refrigeration system. The mechanical refrigeration system generally includes a module which is easy to generate heat such as a controller. If the heat-generating module does not receive timely and effective heat dissipation, it may affect the normal operation of a system.

Therefore, how to provide a reliable chiller with good heat dissipation of the heat-generating module is a technical problem to be solved by those skilled in the art.

SUMMARY

In view of this, an object according to the present application is to provide a chiller, which may improve the heat dissipation effect of a heat-generating module of the chiller and ensure the reliable operation of a system. Another object according to the present application is to provide an energy storage system including the chiller.

In order to achieve the above objects, the following technical solutions are provided according to the present application:

A chiller, including:
- a mechanical refrigeration system, where the mechanical refrigeration system includes a compressor, a condenser, an electronic expansion valve and a heat exchanger which are circularly connected by a refrigerant circulation pipeline, a refrigerant working medium circulates in the refrigerant circulation pipeline, and the mechanical refrigeration system further includes a condensing fan used to dissipate heat for the condenser;
- an electric control box; and
- a warehouse, where the compressor, the condenser, the electronic expansion valve, the heat exchanger and the electric control box are located in the warehouse, the condensing fan is configured to drive external air into the warehouse. The electric control box is adjacent to the condenser and the electric control box and the condenser are inclined to each other, and an air duct with a width gradually decreasing from upstream to downstream in an air flow direction is formed between the electric control box and the condenser.

Since the air duct with the gradual width is formed between the electric control box and the condenser, in case that the condensing fan operates, cold air outside the warehouse is pumped into an interior of the warehouse through the condensing fan and passes through the gradual air duct, so as to ensure the cold air to flow smoothly through the condenser and the electric control box, and ensure uniform heat dissipation of the condenser and the electric control box. According to this solution, there is no need to add an additional heat dissipation device to dissipate heat from the electric control box, and the effective heat dissipation of the electric control box and the condenser may also be ensured, and the operation reliability of a system is improved.

Preferably, a first vent is defined on a side wall of the warehouse corresponding to the electric control box.

Preferably, a heat dissipation fan is arranged in the electric control box.

Preferably, the chiller is applied in an energy storage system provided with a battery set, the chiller further includes a water circulation system, which includes an external circulation water path and an internal circulation water path that is configured to exchange heat with the battery set. The internal circulation water path includes a liquid heat exchange device configured to exchange heat with one or more side surfaces of the battery set, the external circulation water path and the internal circulation water path form a closed circulation water path for circulating a heat exchange working medium. A water pump is provided in the external circulation water path, and the mechanical refrigeration system cools the heat exchange working medium in the external circulation water path through the heat exchanger.

Preferably, a partition is provided in the warehouse, an interior of the warehouse is divided into a first chamber and a second chamber by the partition, the mechanical refrigeration system and the electric control box are located in the first chamber, and the external circulation water path is located in the second chamber.

Preferably, the partition is defined with a second vent, and the water pump is arranged opposite to the second vent.

Preferably, the liquid heat exchange device includes a liquid-cooling plate laid below the battery set;

and/or, the liquid heat exchange device includes a cooling water tank, and the battery set is immersed in the heat exchange working medium in the cooling water tank.

Preferably, the heat exchanger is a plate heat exchanger or a shell-tube heat exchanger.

Preferably, a water temperature sensor configured to detect a temperature of the return water is provided at a return water port of the internal circulation water path.

Preferably, the water pump is a variable frequency water pump, and/or, the compressor is a variable frequency compressor, and/or, the condensing fan is a variable frequency condensing fan.

An energy storage system includes the above chiller is further provided according to the present application. The derivation process of the beneficial effects produced by the energy storage system is generally similar to the derivation process of the beneficial effects produced by the chiller, which will not be repeated here.

BRIEF DESCRIPTION OF THE DRAWINGS

In order to illustrate technical solutions in the embodiments of the present application or in the conventional technology clearly, drawings to be used in the description of the embodiments or the conventional technology are briefly described below. Apparently, the drawings in the following description only show some embodiments of the present disclosure, and other drawings may be obtained by those skilled in the art according to these drawings without any creative work.

DETAILED DESCRIPTION OF THE EMBODIMENTS

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of protection of the present application.

Referring to FIGS. 1 to 9, a chiller is provided according to the present application, which includes a mechanical refrigeration system, an electric control box 27 and a warehouse 100. The mechanical refrigeration system includes a compressor 16, a condenser 17, an electronic expansion valve 19 and a heat exchanger 9 that are circularly connected by a refrigerant circulation pipeline 23, and a refrigerant working medium circulates in the refrigerant circulation pipeline 23. The mechanical refrigeration system further includes a condensing fan 18 for dissipating heat to the condenser 17. The electric control box 27 includes a circuit board. The compressor 16, the condenser 17, the electronic expansion valve 19, the heat exchanger 9 and the electric control box 27 are located in the warehouse 100. The condensing fan 18 is configured to drive external air into the warehouse 100. The electric control box 27 is adjacent to the condenser 17 and the electric control box 27 and the condenser 17 are inclined to each other. An air duct with a width gradually decreasing from upstream to downstream in an air flow direction is formed between the electric control box 27 and the condenser 17.

Since the air duct with the gradual width is formed between the electric control box 27 and the condenser 17, in case that the lower condensing fan 18 operates, cold air outside the warehouse 100 is pumped into an interior of the warehouse 100 through the condensing fan 18 and passes through the gradual air duct, so as to ensure the cold air to flow smoothly through the condenser 17 and the electric control box 27, and ensure uniform heat dissipation of the condenser 17 and the electric control box 27. According to this solution, there is no need to add an additional heat dissipation device to dissipate heat from the electric control box 27, and the effective heat dissipation of the electric control box 27 and the condenser 17 may also be ensured, and the operation reliability of a system is improved.

Figure 7:
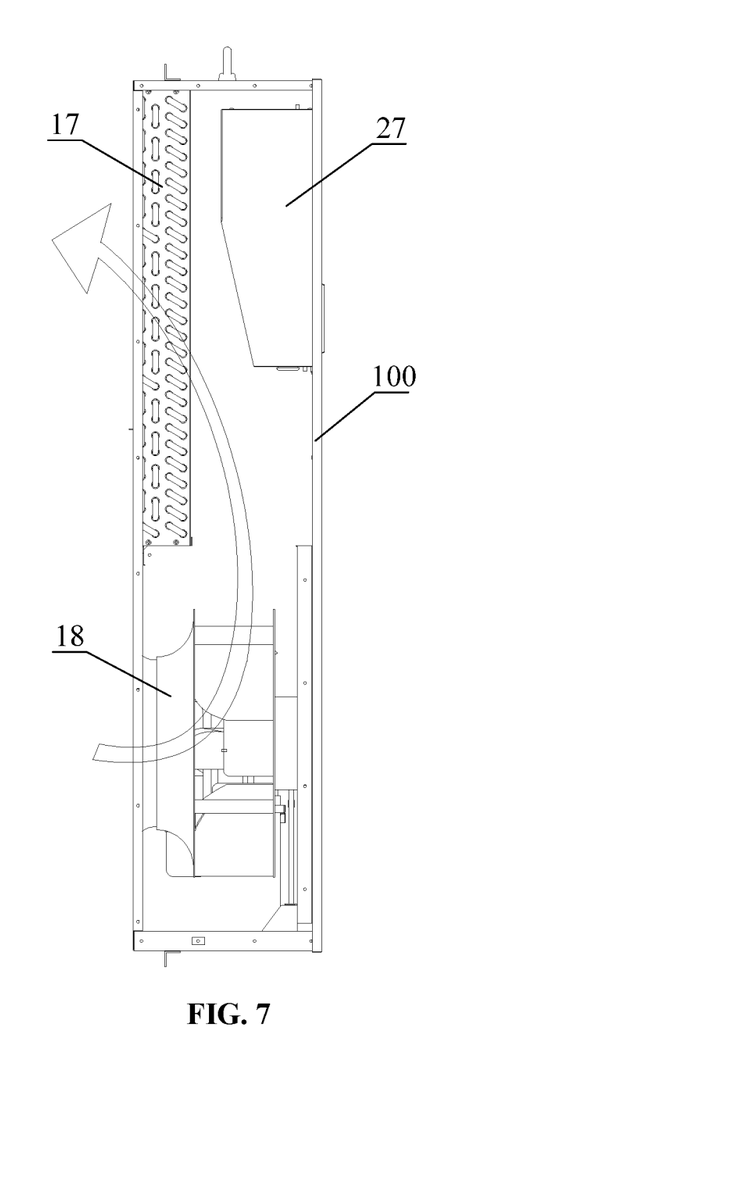
FIG. 7 is an internal side view of a warehouse according to a specific embodiment of the present application.

It should be noted that, the condensing fan 18 may be arranged outside the warehouse 100, and guide the external air into the interior of the warehouse 100 through an air guiding device. The condensing fan 18 may also be arranged inside the warehouse 100, or arranged on a side wall of the warehouse 100 and guide the external air into the warehouse 100 through a cold air inlet defined on the side wall of the warehouse 100. The condensing fan 18 may be located below, above, on the left side or on the right side of the above air duct. Preferably, the condensing fan 18 in the solution is located below the air duct, and the side wall of the warehouse 100 is defined with the cold air inlet for the cold air to enter. An inlet end of the condensing fan 18 is preferably arranged opposite to the cold air inlet, and an outlet end of the condensing fan 18 is preferably arranged opposite to the air duct. An upper end of the warehouse 100 is preferably designed with a cold air outlet opposite to the air duct, the cold air outside the warehouse 100 is pumped to the interior of the warehouse 100 through the condensing fan 18, and then the cold air passes through the air duct between the electric control box 27 and the condenser 17 and cools the electric control box 27 and the condenser 17 at the same time, and finally the cold air flows out from the cold air outlet at the top of the warehouse 100. As shown in FIG. 7, the hollow arrow in FIG. 7 represents the flow path of the cold air.

Figure 2:
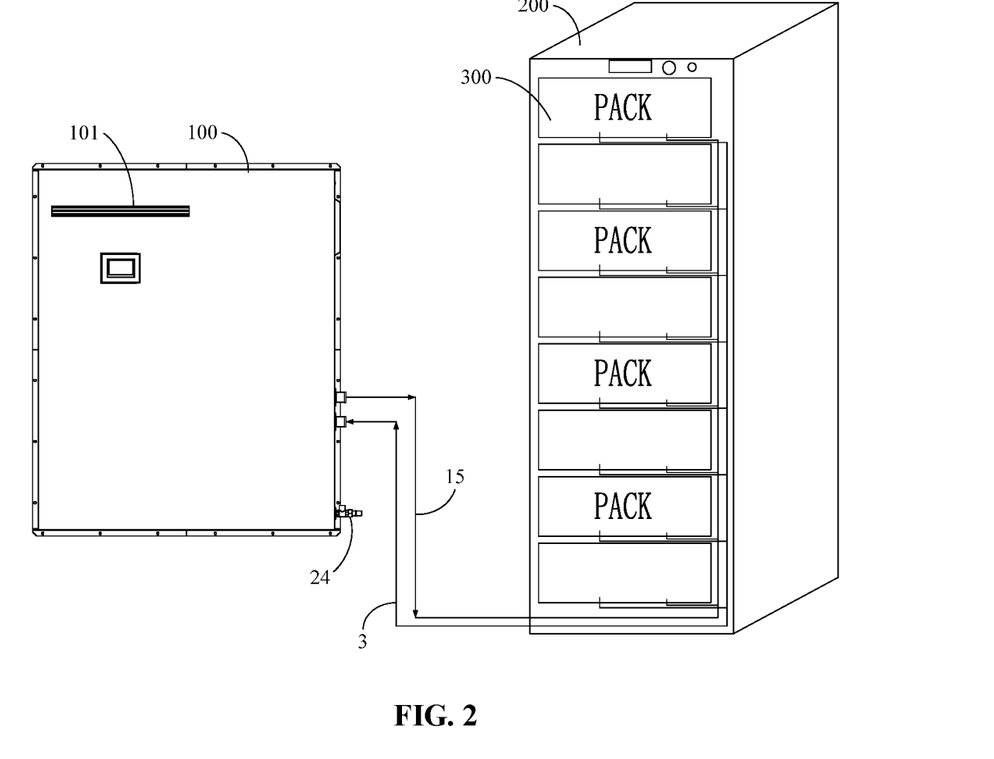
FIG. 2 is a schematic diagram of the arrangement of the chiller applied in an energy storage system according to a specific embodiment of the present application.
Figure 8:
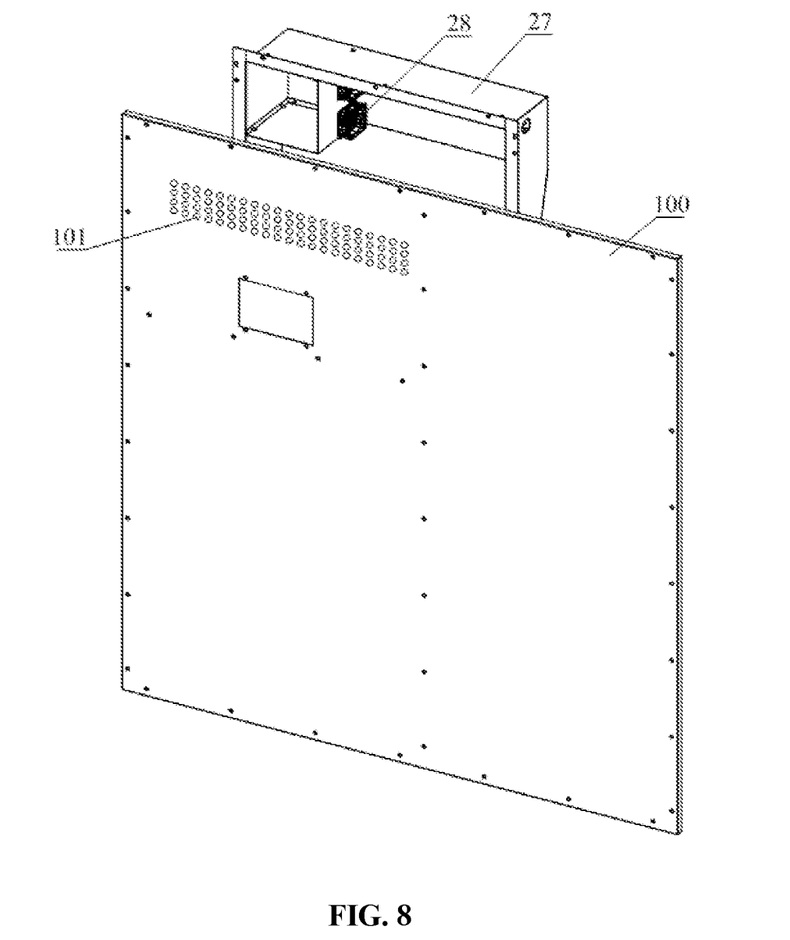
FIG. 8 is a partial structural schematic diagram of the warehouse and an electric control box according to a specific embodiment of the present application.

Preferably, a first vent 101 is defined on a side wall of the warehouse 100 corresponding to the electric control box 27. As shown in FIG. 2 and FIG. 8, since the electric control box 27 generates much heat during the operation process, the natural convection and heat exchange between the cold air outside the chiller and the hot air inside the warehouse 100 can be utilized according to the solution by defining multiple first vents 101 on the side wall of the warehouse 100, so as to take away the heat generated by the electric control box 27, which further improves the heat dissipation efficiency of the heat-generating member.

Further preferably, a heat dissipation fan 28 is arranged in the electric control box 27, as shown in FIG. 8. In this solution, a heat dissipation fan 28 is additionally provided to pump the cold air outside the warehouse 100 to the electric control box 27, which may accelerate the convection heat transfer of the external cold air and the hot air inside the warehouse 100, and improve the heat dissipation efficiency of the electric control box 27.

It should be noted that, the chiller provided according to the present application may be applied to various industries such as medical, electronic, manufacturing and energy storage. In a specific embodiment, the chiller of the solution is applied in an energy storage system provided with a battery set 1, the chiller further includes the mechanical refrigeration system, the electric control box 27 and the warehouse 100 described above, and further includes a water circulation system. The water circulation system includes an external circulation water path 400 and an internal circulation water path 500 which is configured to exchange heat with the battery set 1, the internal circulation water path 500 includes a liquid heat exchange device 2 configured to exchange heat with one or more side surfaces of the battery set 1, the external circulation water path 400 and the internal circulation water path 500 form a closed circulation water path for circulating a heat exchange working medium, and a water pump 8 is provided on the external circulation water path 400. The mechanical refrigeration system cools the heat exchange working medium in the external circulation water path 400 through the heat exchanger 9. Moreover, the heat exchanger 9 may be a plate heat exchanger or a shell-tube heat exchanger. In addition, a replenishment port 24 is further provided below the warehouse 100, and the replenishment port 24 is connected to the external circulation water path 400. In a case that the heat exchange working medium in a water circulation system decreases, the heat transfer working medium is replenished through the replenishment port 24, and the heat exchange working medium in the water circulation system may be water, ethylene glycol or other refrigerant, and an ethylene glycol aqueous solution is preferred in this solution.

The working principle of the chiller provided according to this solution is as follows:

in a case that the energy storage system has a refrigeration demand, the water pump 8 of the water circulation system is started to make the heat transfer working medium circulate, and the mechanical refrigeration system is started to output the cold capacity. The heat exchange working medium heated by the energy storage system enters the external circulation water path 400 from a return water port of the internal circulation water path 500, and the high-temperature heat exchange working medium exchanges heat with a refrigerant working medium of the mechanical refrigeration system at the heat exchanger 9 to obtain a low-temperature heat exchange working medium. The low-temperature heat exchange working medium is introduced into the internal circulation water path 500, and cools the heated battery set 1 through the liquid heat exchange device 2, and finally flows back to the external circulation water path 400 through the return water port, thereby realizing the cooling cycle of the energy storage system.

In a case that the energy storage system has no refrigeration demand, the water circulation system can only be started in this solution, the mechanical refrigeration system stops operating, the water pump operates at a low frequency and realizes self-circulation cooling of the heat exchange working medium. The internal circulation water path 500 flows through the battery sets 1, so as to equalize the temperature difference of the battery sets 1 of the energy storage system.

Since the mechanical refrigeration system is not required to be opened, the system energy consumption of the chiller can be further saved.

It should be noted that, the high-temperature and low-temperature herein refer to the relative temperature of the liquid circulating in different pipes of the circulation system.

The liquid heat exchange device 2 which exchanges heat with a surface of the battery set 1 is used by the solution to realize the cooling cycle of the energy storage system. Compared with the conventional air-cooling heat dissipation method, the liquid-cooling method used in the solution may greatly improve the heat exchange coefficient with the battery set 1 and avoid generating a heat exchange dead zone. The circulating heat exchange working medium is used to uniformly cool the surface of the battery set 1 and improve the heat exchange uniformity of the battery sets 1. Therefore, this solution may improve the heat exchange efficiency of the energy storage system and achieve the object of uniform heat management.

Preferably, a partition 103 is provided in the warehouse 100 in this solution, an interior of the warehouse 100 is divided into a first chamber 104 and a second chamber 105 by the partition 103, the mechanical refrigeration system and the electric control box 27 are located in the first chamber 104, and the external circulation water path 400 is located in the second chamber 105. With this arrangement, the external circulation water path 400 and the mechanical refrigeration system may be arranged separately, which may not affect each other when the system is operating. In addition, part of the devices may be placed in a relatively clean chamber for operation, which improves reliability and prolongs the service life of the chiller.

Figure 9:
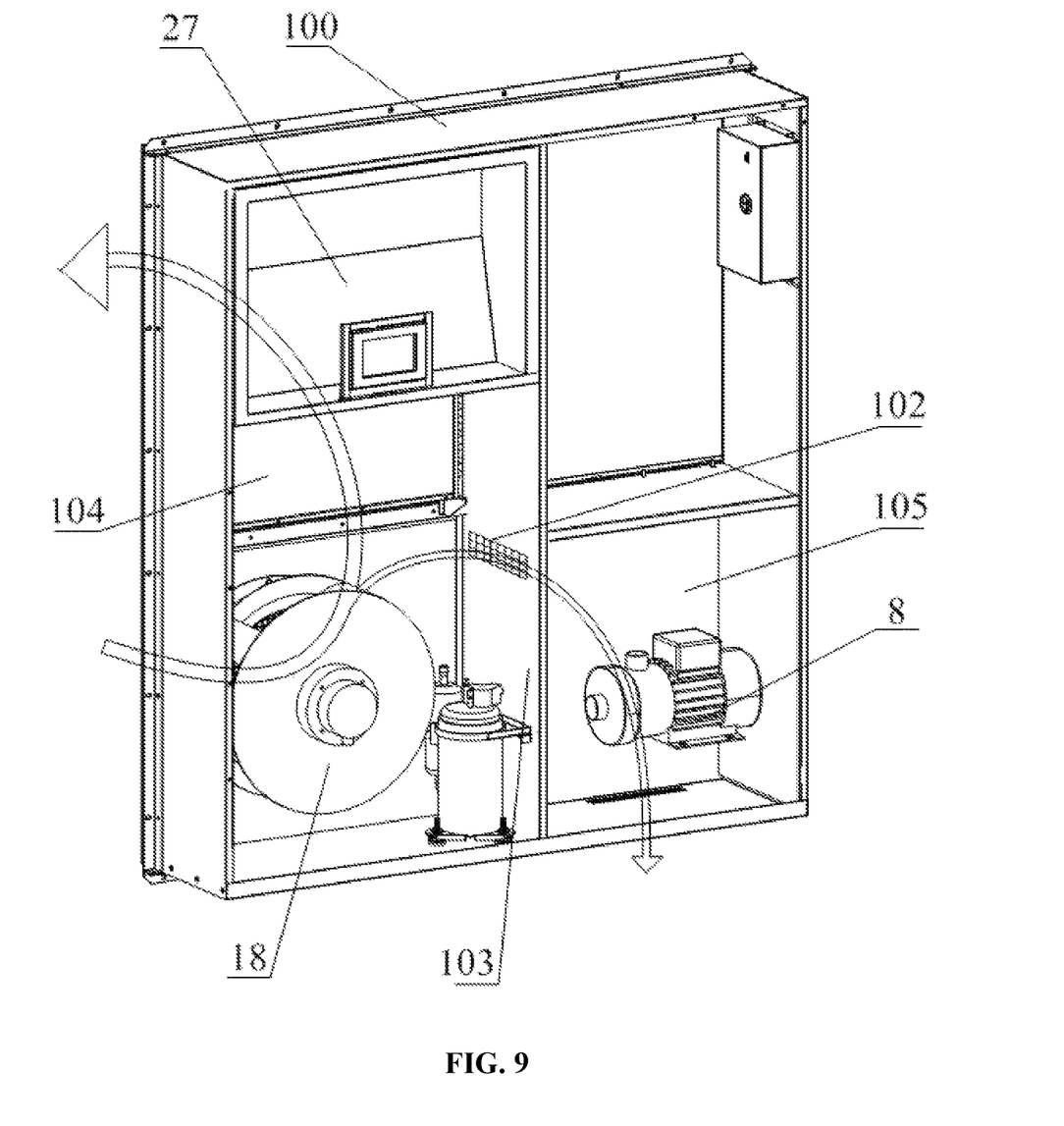
FIG. 9 is a schematic diagram of two chambers in the warehouse according to a specific embodiment of the present application.

Preferably, a second vent 102 is defined on the partition 103, and the water pump 8 is arranged opposite to the second vent 102. With this arrangement, when the condensing fan 18 is operating, part of the cold air blown out of the condensing fan 18 enters the second chamber 105 through the second vent 102, so as to dissipate heat for the water pump 8 of the external circulation water path 400 without adding an additional heat dissipation fan for the water pump 8, which is more energy-saving and efficient. As shown in FIG. 9, the hollow arrow in FIG. 9 represents the flow path of the cold air.

The internal circulation water path 500 of the water circulation system is mainly configured to exchange heat with the battery set 1 inside the energy storage system, so as to realize the cooling of the battery set 1. The external circulation water path 400 is configured to exchange heat with the mechanical refrigeration system outside the energy storage system, so as to obtain a low-temperature heat exchange working medium. Specifically, the internal circulation water path 500 includes a return water pipeline 3 and a water supply pipeline 15. The heat exchange working medium in the external circulation water path 400 enters the liquid heat exchange device 2 inside the energy storage system through the water supply pipeline 15, and the heat exchange working medium flows back to the external circulation water path 400 through the return water pipeline 3 after it exchanges heat with the battery set 1. A water inlet of the water supply pipeline 15 is a water inlet of the internal circulation water path 500, and a water outlet of the return water pipeline 3 is a water outlet of the internal circulation water path 500. The external circulation water path 400 includes an inlet pipeline 5 and an outlet pipeline 14. The heat exchange working medium returned from the return water pipeline 3 enters the inlet pipeline 5, and the heat exchange working medium flows through the water pump 8 and the heat exchanger 9 and other devices in a list sequence and passes through the outlet pipeline 14 to the water supply pipeline 15. Therefore, a water inlet of the inlet pipeline 5 is a water inlet of the external circulation water path 400, and a water outlet of the outlet pipeline 14 is a water outlet of the external circulation water path 400. The water pump 8 is arranged on the inlet pipeline 5 or the outlet pipeline 14, and the water pump 8 provides continuous circulation power for the water circulation system.

Figure 3:
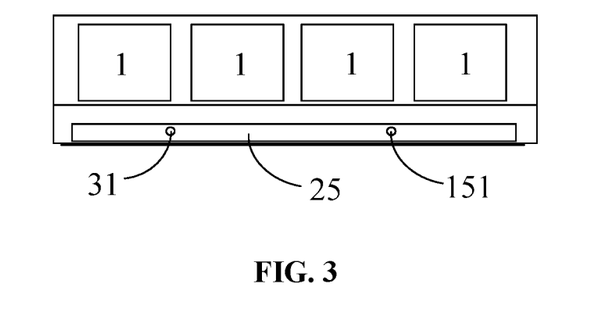
FIG. 3 is a schematic diagram of a first liquid heat exchange device according to a specific embodiment of the present application.
Figure 4:
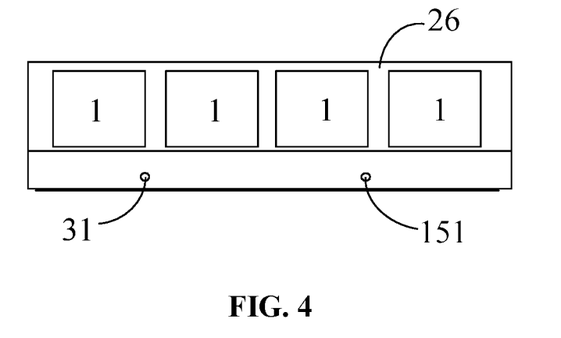
FIG. 4 is a schematic diagram of a second liquid heat exchange device according to a specific embodiment of the present application.

It should be noted that, the liquid heat exchange device 2 according to the present application may be designed in a variety of structural forms, such as a liquid-cooling plate or a liquid-cooling pipe structure designed for circulating the heat exchange working medium, or designed as a water tank structure or a box structure, etc. The heat exchange working medium and the battery set 1 may be separated by a side wall of the liquid heat exchange device 2, or the heat exchange working medium may be in contact with an outer surface of the battery set 1. In a preferred solution, the liquid heat exchange device 2 includes a liquid-cooling plate 25 laid below the battery set 1. As shown in FIG. 3, the cooling plate 25 is located at the bottom of the battery set 1, and the circulating heat exchange working medium is introduced through the liquid-cooling plate 25 to cool the battery set 1 through heat conduction. A water supply port joint 151 for passing in the low-temperature heat exchange working medium is provided on the liquid-cooling plate 25, and a return water port joint 31 is further provided on the liquid-cooling plate 25 for flowing out the high-temperature heat exchange working medium after heat exchange. In another preferred solution, the liquid heat exchange device 2 includes a cooling water tank 26, and the battery set 1 is immersed in the heat exchange working medium in the cooling water tank 26. As shown in FIG. 4, in a case that the heat exchange working medium circulates, it may exchange heat with each side of the battery set 1, so as to improve the heat exchange efficiency and improve the temperature uniformity of the battery set 1. Of course, the energy storage system generally has multiple battery sets 1. As shown in FIG. 2, multiple battery packs 300 are generally arranged in an energy storage system cabinet 200. Each battery pack 300 may be arranged with multiple battery sets 1. Therefore, the two types of the liquid heat exchange device 2 of the above cooling plate 25 and the cooling water tank 26 may be combined to use according to the present application.

Figure 1:
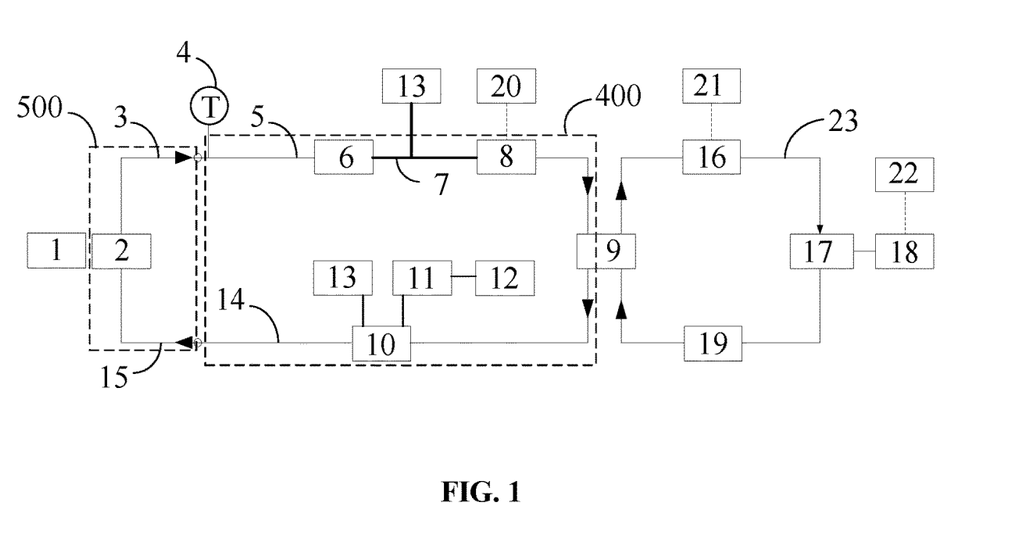
FIG. 1 is a schematic diagram of the circulation arrangement of various members of a chiller according to a specific embodiment of the present application.

Preferably, the condensing fan 18 of the mechanical refrigeration system is a variable frequency condensing fan. In addition, the water pump 8 may be a variable frequency water pump, and the compressor 16 may also be a variable frequency compressor. With this arrangement, the solution may realize the function of variable frequency refrigeration, and further save energy consumption. As shown in FIG. 1, the water pump 8 is controlled by a water pump variable frequency controller 20, the compressor 16 is controlled by a compressor variable frequency controller 21, and the condensing fan 18 is controlled by a condensing fan variable frequency controller 22.

In order to improve the reliability of the system, preferably, as shown in FIG. 1, the water pump 8 is arranged on the inlet pipeline 5, and a filter 6 is provided between an inlet of the inlet pipeline 5 and the water pump 8, so as to filter impurities in the flowing water. The filter 6 may be a Y-type filter or a basket filter, and a filter element may be repeatedly cleaned and replaced.

Figure 5:
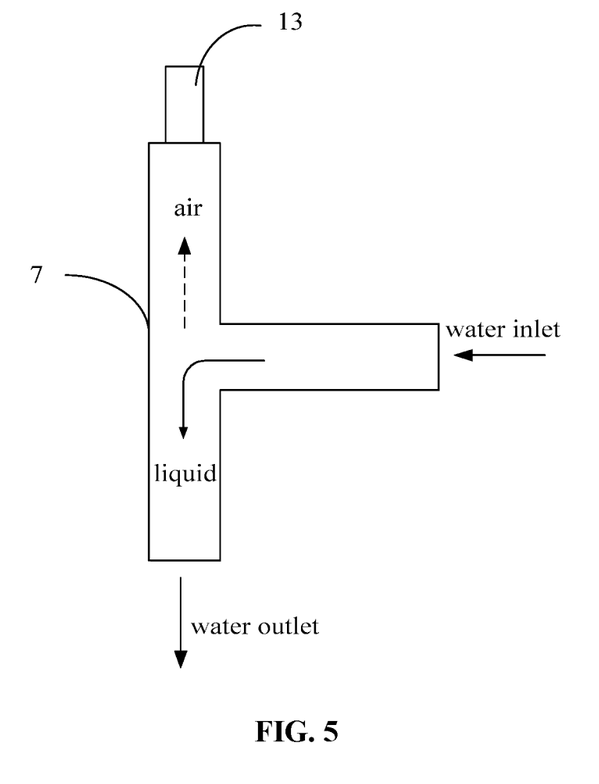
FIG. 5 is a schematic diagram of a buffer pipeline according to a specific embodiment of the present application.

Further preferably, as shown in FIG. 1 and FIG. 5, the inlet pipeline 5 is provided with a buffer pipeline 7 between the filter 6 and the water pump 8, and the buffer pipeline 7 is a three-way pipeline. A first end of the buffer pipeline 7 is connected to an outlet of the filter 6, a second end of the buffer pipeline 7 is connected to an exhaust member and is arranged upward, and a third end of the buffer pipeline 7 is connected to an inlet of the water pump 8. The heat exchange working medium is first filtered by the filter 6 after it enters the inlet pipeline 5, and then passes through the buffer pipeline 7. The buffer pipeline 7 may be a branched three-way pipeline, such as a Y-type pipeline or a T-type pipeline. The exhaust member is preferably an exhaust valve 13, one end of the buffer pipeline 7 provided with the exhaust member is arranged upward, and is preferably at a highest position of the system or a place where the gas is easily stored, which may be the top of the water tank. As shown in FIG. 5, after the heat exchange working medium carrying air enters the buffer pipeline 7 through a water inlet end, since the heat exchange working medium first impacts a pipe wall of the buffer pipeline 7, most of the air in the heat exchange working medium rises upward and is discharged through the exhaust member, and the air-removed liquid flows downwards out of a water outlet end. The buffer pipeline 7 discharges the air that may exist in the flowing water, which may effectively protect the water pump 8 at the rear end, prolong the service life of the water pump 8, and reduce the maintenance frequency of the system.

Figure 6:
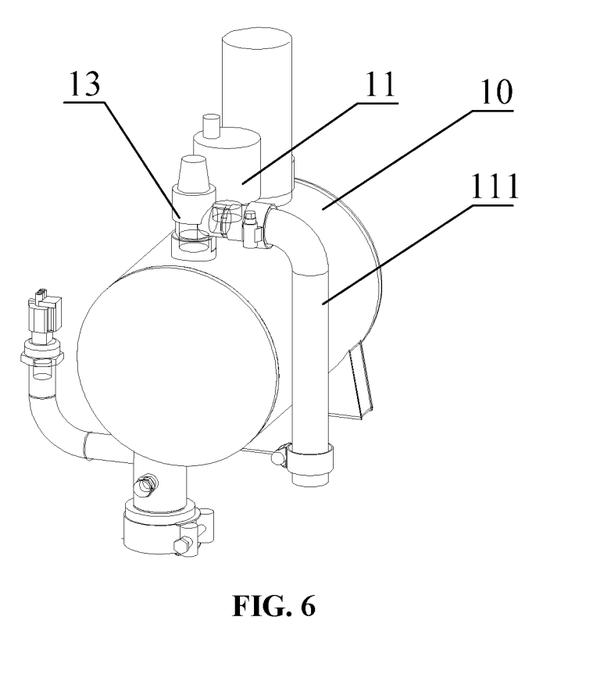
FIG. 6 is a schematic diagram of a buffer water tank according to a specific embodiment of the present application.

Preferably, in this solution, a buffer water tank 10 is further provided on the external circulation water path 400. An upper end of the buffer water tank 10 is connected with an exhaust member, and the exhaust member is preferably an exhaust valve 13. As shown in FIG. 1 and FIG. 6, the buffer water tank 10 is a closed structure. In a case that the heat exchange working medium passes through the buffer water tank 10, the air in the flowing water rises and is discharged from the exhaust member, so as to avoid affecting the subsequent cooling water path and the liquid cooling device 2. In order to improve the reliability of the system, preferably, a safety valve 11 is further provided on the upper end of the buffer water tank 10, a liquid storage box 12 for containing the heat exchange working medium is provided on an outer side of the buffer water tank 10, and the safety valve 11 is connected to the liquid storage box 12 through an overflow pipeline 111. In a case that an internal pressure of the water circulation system is less than a preset pressure value, the safety valve 11 remains closed, and in a case that the internal pressure of the water circulation system reaches or exceeds the preset pressure value, the safety valve 11 automatically opens to relieve the pressure, so as to discharge the air and the excess heat exchange working medium in the system, and maintain the stability of the pressure and the water volume of the system. When the safety valve 11 opens to drain water, the liquid storage box 12 collects the excess heat exchange working medium discharged from the water circulation system, which facilitates the recovery and reuse of the liquid working medium, and also makes the solution more environmentally friendly.

Preferably, a water temperature sensor 4 configured to detect a temperature of the return water is provided at the return water port of the internal circulation water path 500. The temperature of the heat exchange working medium can be monitored in real time through the water temperature sensor 4. In case that the energy storage system has a cooling demand, the temperature of the heat exchange working medium flowing back from the return water pipeline 3 has a deviation from the preset temperature. In a case that the deviation exceeds a threshold, the water temperature sensor 4 may be connected with the control devices of the water pump 8 and the compressor 16, so as to automatically start the refrigeration cycle. In addition, in this solution, the heating value of the battery set 1 is monitored and tracked in real time through the water temperature sensor 4, and start-stop control devices of the water pump 8 and the mechanical refrigeration system adjust an output power of the water pump 8 and the mechanical refrigeration system in real time according to the heating value detected by the water temperature sensor 4, so as to adjust the corresponding cooling capacity, avoid frequent temperature fluctuations in the water circulation system, and achieve the object of energy-saving and efficient thermal management.

An energy storage system including the above chiller is further provided according to the present application. The energy storage system further includes an energy storage system cabinet 200, and the energy storage system cabinet 200 is preferably arranged with multiple battery packs 300, and each of the battery packs 300 is preferably arranged with multiple battery sets 1, as shown in FIG. 2. The derivation process of the beneficial effects generated by the energy storage system is substantially similar to the derivation process of the beneficial effects brought by the above chiller, which is not repeated here.

The above illustration of the disclosed embodiments can enable those skilled in the art to implement or use the present application. Various modifications to the embodiments are apparent to the person skilled in the art, and the general principle herein can be implemented in other embodiments without departing from the spirit or scope of the present application. Therefore, the present application is not limited to the embodiments described herein, but should be in accordance with the broadest scope consistent with the principle and novel features disclosed herein.

The invention claimed is:

1. A chiller, comprising:
a mechanical refrigeration system, which comprises a compressor, a condenser, an electronic expansion valve and a heat exchanger, which are circularly connected by a refrigerant circulation pipeline, a refrigerant working medium circulates in the refrigerant circulation pipeline, and the mechanical refrigeration system further comprises a condensing fan used to dissipate heat for the condenser;
an electric control box; and
a warehouse, wherein the compressor, the condenser, the electronic expansion valve, the heat exchanger and the electric control box are located in the warehouse, the condensing fan is configured to drive external air into the warehouse, the electric control box is adjacent to the condenser, and the electric control box is inclined toward the condenser, and an air duct with a width decreasing from upstream to downstream in an air flow direction is formed between the electric control box and the condenser; and wherein
the chiller is configured to be applied in an energy storage system provided with a battery set, the chiller further comprises a water circulation system, the water circulation system comprises an external circulation water path and an internal circulation water path which is configured to exchange heat with the battery set, the internal circulation water path comprises a liquid heat exchange device configured to exchange heat with one or more side surfaces of the battery set, the external circulation water path and the internal circulation water path form a closed circulation water path for circulating a heat exchange working medium, a water pump is provided in the external circulation water path, and the mechanical refrigeration system cools the heat exchange working medium in the external circulation water path through the heat exchanger.

2. The chiller according to claim 1, wherein a first vent is defined on a side wall of the warehouse corresponding to the electric control box.

3. The chiller according to claim 2, wherein a heat dissipation fan is arranged in the electric control box.

4. The chiller according to claim 1, wherein a partition is provided in the warehouse, an interior of the warehouse is divided into a first chamber and a second chamber by the partition, the mechanical refrigeration system and the electric control box are located in the first chamber, and the external circulation water path is located in the second chamber.

5. The chiller according to claim 4, wherein a vent is defined on the partition, and the water pump is arranged opposite to the vent.

6. The chiller according to claim 1, wherein the liquid heat exchange device comprises a liquid-cooling plate configured to be laid below the battery set;
and/or, the liquid heat exchange device comprises a cooling water tank, and the heat exchange working medium in the cooling water tank is configured to immerse the battery set.

7. The chiller according to claim 1, wherein the heat exchanger is a plate heat exchanger or a shell-tube heat exchanger.

8. The chiller according to claim 1, wherein the water pump is a variable frequency water pump, and/or, the compressor is a variable frequency compressor, and/or, the condensing fan is a variable frequency condensing fan.

9. The chiller according to claim 1, wherein the warehouse is provided with a replenishment port connecting to the external circulation water path.

10. The chiller according to claim 1, wherein the external circulation water path comprises an inlet pipeline and an outlet pipeline, and a filter provided between the inlet pipeline and the water pump.

11. The chiller according to claim 10, wherein a buffer pipeline is provided between the filter and the water pump.

12. The chiller according to claim 11, wherein the buffer pipeline is a three-way pipeline comprising a first end, a second end and a third end, wherein the first end is connected to an outlet of the filter, the second end is connected to an exhaust valve, and the third end is connected to an inlet of the water pump.

13. The chiller according to claim 1, wherein a buffer water tank is provided on the external circulation water path.

14. The chiller according to claim 13, wherein an exhaust valve is connected to an upper end of the buffer water tank.

15. The chiller according to claim 13, wherein a safety valve is connected to an upper end of the buffer water tank.

16. The chiller according to claim 15, wherein a liquid storage box is arranged on the outside of the buffer water tank, and the liquid storage box is connected to the safety valve through an overflow pipeline.

17. The chiller according to claim 1, wherein the internal circulation water path comprises a return water port, the water return port is provided with a sensor for detecting the temperature of return water.

18. An energy storage system, comprising the chiller according to claim 1.

19. The energy storage system according to claim 18, comprising an energy storage system cabinet, wherein a plurality of battery packs are arranged in the energy storage system cabinet, and the battery packs comprise a plurality of battery sets.

* * * * *